Feb. 23, 1960
R. W. BARGGREN
2,925,644
ROTARY FILE
Filed Jan. 27, 1958
2 Sheets-Sheet 2
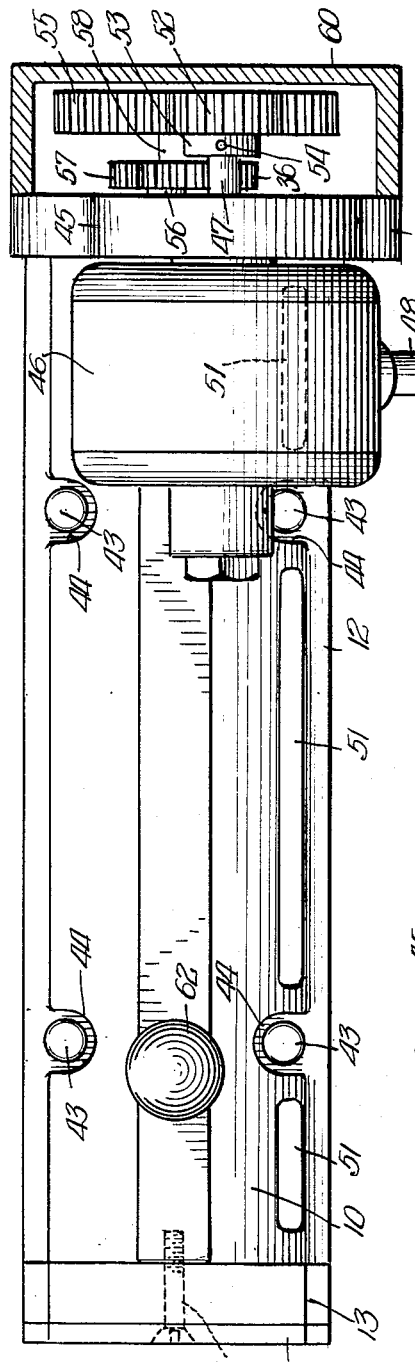
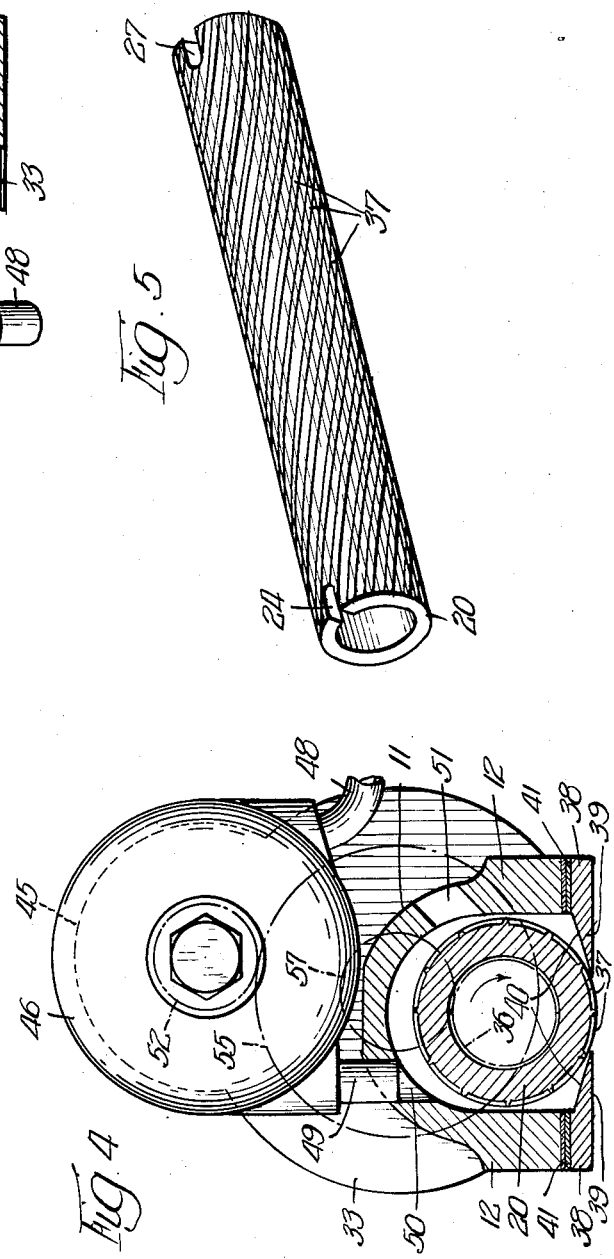
INVENTOR.
Richard W. Barggren,
BY B. Pelechowicz
Atty.

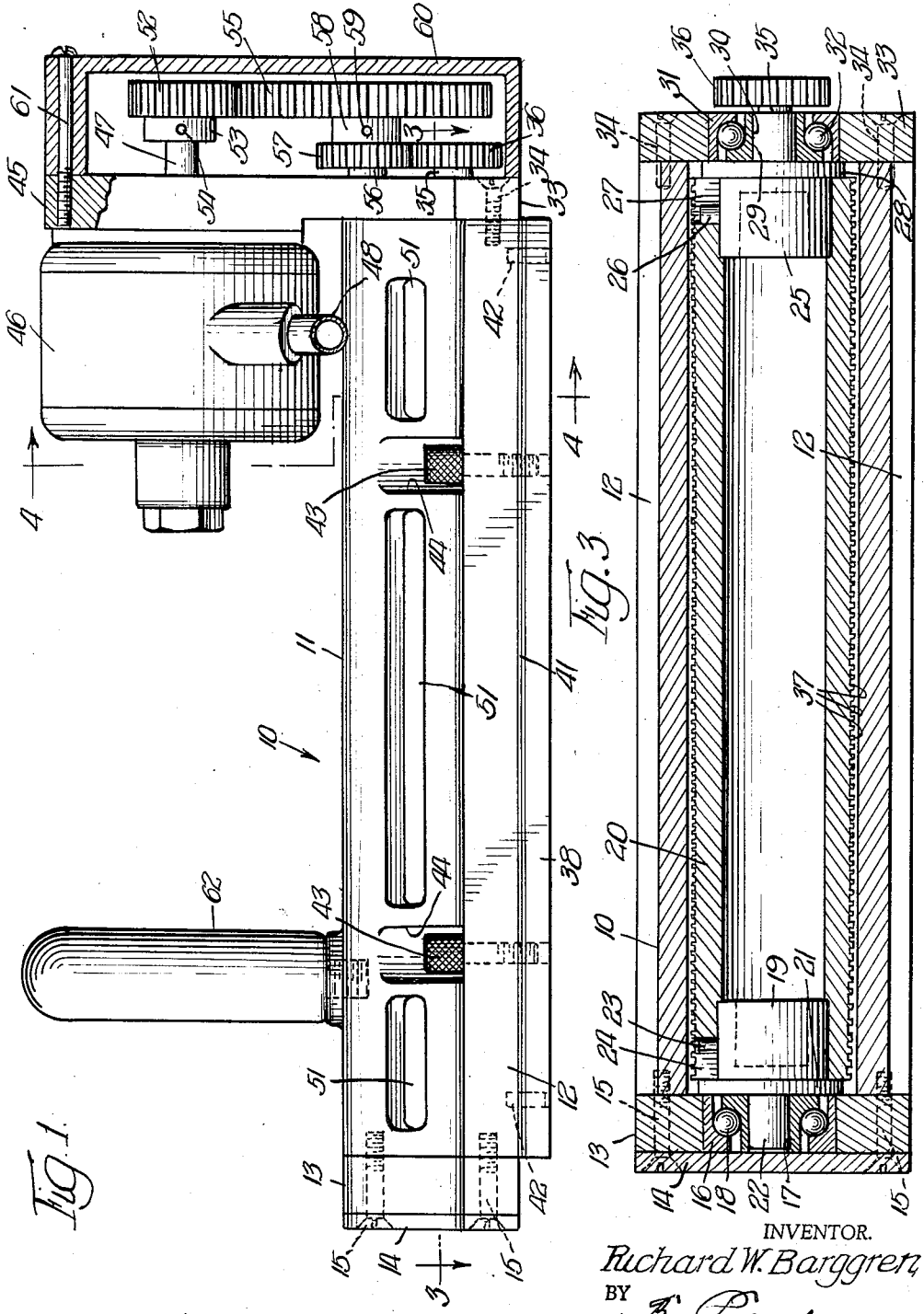

United States Patent Office 2,925,644
Patented Feb. 23, 1960

2,925,644

ROTARY FILE

Richard W. Barggren, Chicago, Ill.

Application January 27, 1958, Serial No. 711,468

2 Claims. (Cl. 29—76)

The present invention relates to rotary files, and has for its main object the provision of a cylindrical member provided on its surface with helical cutting ridges or teeth capable of cutting into a metal or other work when a rotary shifting movement is imparted to the cylindrical file member.

Another object of the present invention is the provision, in a rotary file of the character hereinabove indicated, of suitable means for regulating or adjusting the cutting depth of the cylindrical file member into the work.

Another object of the present invention is the provision of suitable means for supporting the cylindrical file member in its rotary movement and whereby cylindrical file members having various cutting ridges or teeth may be interchangeably supported in their rotary movement.

A still further object of the present invention is the provision, in connection with a rotary file member, of suitable motive means whereby a rotary shifting movement to the cylindrical file member may be imparted.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views:

Fig. 1 is a side elevational view, partly in section, of the present device;

Fig. 2 is a top plan elevational view thereof, partly in section;

Fig. 3 is a longitudinal cross sectional view through the device, on a horizontal plane, taken on line 3—3 of Fig. 1;

Fig. 4 is a cross sectional view, partly in elevation, taken on line 4—4 of Fig. 1, also diagrammatically illustrating a series of gears for imparting a rotary movement to the cylindrical file member; and Fig. 5 is a perspective view of the rotary file member used in connection with the device.

Referring to the present drawings in detail there is shown therein a longitudinal casing 10, which on a transverse cross section is of a substantially semi-annular formation, and which includes dome portion 11 and a pair of integrally formed and downwardly depending therefrom straight walls 12, as is seen in Fig. 4.

Affixable to one end of said casing 10 is apertured head or plate 13, generally conforming in its transverse outline to the formation of said casing 10 on transverse plane. In the operative position of said plate 13 the inner face thereof contacts the adjacent end of said casing 10, while the outer face of said plate 13 receives closure 14. A plurality of screws 15, passed through said closure 14 and plate 13, engage the adjacent end of said casing 10 and rigidly maintain the former with the latter.

Receivable within the aperture in said plate 13 is an outer race 16. Receivable within said outer race 16, in a spaced relation, is inner race 17. Interposed between two races is ball bearing 18.

The device further includes cylindrical plug 19 which enters the adjacent end of the tubular file member 20. Rigidly formed with the outer end of said plug 19 is washer 21, from which axial stud 22 extends and enters said inner race 17. Laterally extending from said plug 19 in a radial relation therewith, is pin 23 which enters key slot 24 made in the adjacent end of said tubular file member 20.

Said axial stud 22 is frictionally positioned within said inner race 17, or in the alternative said washer 21 may be integrally formed with the adjacent end of said race 17, whereby said inner race 17, plug 19, washer 21 and axial stud 22 may bodily rotate, by virtue of the connection between said plug 19 and said tubular file member 20 through the medium of pin 23 and slot 24, when a rotary movement is imparted to said tubular file member 20.

Similar supporting means for rotary shifting movement of said tubular file member 20 is provided at the opposite end of said tubular file member 20. This latter means includes cylindrical plug 25 entering the adjacent end of said tubular file member 20 and disengageably connects therewith through laterally extending radial pin 26 which enters key slot 27 made in the adjacent end of said tubular file member 20. Washer 28 is integrally formed with the outer end of said plug 25. Extending from said washer 28, in a co-axial relation with said plug 25 is stud 29 which enters the inner race 30. Said inner race 30 enters the outer race 31 in a spaced relation and is guided in its rotary movement by means of ball bearing 32 interposed between said races 30 and 31. The outer race 31 is located within an aperture made in head or plate 33 and is frictionally or otherwise rigidly held therewithin.

Said stud 29 may frictionally connect with said inner race 30, or in the alternative said washer 28 may be rigidly connected with the adjacent end of said inner race 30.

Plate 33 is rigidly affixed to the adjacent end of casing 10 by means of a plurality of screws 34.

Extending from the outer end of said stud 29 is a reduced shaft 35, to the outer end of which gear 36 is keyed.

Washers 21 and 28, being interposed between the respective adjacent ends of said tubular file member 20 and the respective plates 13 and 33, and their coacting races, maintain the adjacent ends of said tubular file member 20 in a spaced relation therewith, as is seen in Fig. 3.

The tubular file member 20 is provided upon its surface with a plurality of helical cutting ridges or teeth 37, the curve of which has a right helix, to conform the same to the clockwise direction of the rotation of cylinder 20, as indicated by an arrow in Figure 4. Were the helix of said cutting ridges 37 a left one with the clockwise direction of rotation of cylinder 20, as viewed in Fig. 4, or were the helix of said cutting ridges 37 a right one with a counterclockwise direction of said tubular file member 20, the cutting action of said cutting ridges 37 upon the work would be deficient. Hence, it is important to determine the direction of the helix of said cutting ridges 37 in order to conform the same to a corresponding direction of rotation of the tubular file member 20 in order to bring about a proper and efficient cutting operation of the tubular file member 20 upon the work. Stated in other words, it is important to connect a given end of the tubular file member 20 with its proper or predetermined plug 19 or 25 through the medium of pins 23 or 26 and the respective slots 24 and 27, depending upon the direction of the helix of said cutting ridges 37 and the direction of rotation of the tubular file member 20. This correlation may be determined and maintained by making pin 23 of a diameter smaller than the diameter of pin 26 with the width of the respective slots 24 and 27 to correspond with the diameters of the respective pins 23 and 26. Due to this arrangement the location of the respective ends of the tubular file member 20 cannot be reversed for the reason that pin 26 cannot enter slot 24. This is important to observe, particularly when various tubular file members 20 of finer or rougher cutting ridges 37 may be interchangeably employed in the device.

The substitution of or for any given tubular cutting member 20, or removal thereof for the purpose of cleaning, is a simple matter. All that needs to be done is to remove screws 15 and detach plate 13 and closure 14 from the adjacent end of casing 10. With the removal thereof plug 19 will be removed from its engagement with the adjacent end of the tubular file member 20, and thereupon through the open end of casing 10 the tubular file member 20 may also be shifted outwardly from said casing 10. Removal of the tubular file member 20 does not in any manner dislocate plug 25 or its appurtenances. Shifting of the tubular file member 20 from within casing 10 simply slips off the adjacent end of said member 20 from its engagement with pin 26.

The means for predetermining the cutting depth into the work by the tubular file member 20 includes a pair of guides 38, one affixable to the lower end of each wall 20 of casing 10. Each guide 38 has an integrally formed extension 39 directed toward the vertical transverse center line of said casing 10 and of said tubular file member 20. To prevent interference of said extensions 39 with the periphery of said tubular file member 20, the upper wall of each is downwardly tapered as at 40 thereby bringing the inner edge of each extension 39 to a sharp point, as is clearly seen in Fig. 4.

The inner edges of said extensions 39 define an oblong slot through which a portion of the tubular file member 20 is caused to extend. Said extending portion of the periphery of said tubular file member 20, coming in contact with the work does the filing operation thereon when said tubular file member 20 is caused to rotate. It is noted that the lower faces of said guides 38 and the lower faces of said extensions 39 are in a horizontal coplanar position, and when said faces come in contact with the work said guides 38 and extensions 39 constitute a stop for preventing further cutting action by the tubular file member 20 upon the work. The depth of the cut of the tubular file member 20 into the work may be regulated by means of interposition of one or more shims 41 between the lower ends of walls 12 and said guides 38, as seen in Figs. 1 and 4. Of course, all of said shims 41 may be withdrawn, in which case guides 38 will become raised, thereby causing a greater depth of the tubular file member 20 to extend past and beyond the inner edges of said extensions 39 and consequently past and beyond the lower horizontal faces of said guides 38 and said extensions 39. On inserting one or more shims 41 between said walls 12 and guides 38 the degree of extension of the periphery of said tubular file member 20 in a downward direction past the inner edges of said extensions 39 will become reduced, thereby reducing the cutting depth of said tubular file member 20 into the work.

Downwardly depending from the lower end of each side wall 12 of casing 10 is at least a pair of locating pins 42, one adjacent each end of each wall 12, which enter corresponding apertures made in said shims 41 and guides 38, as is seen in Fig. 1. When said locating pins 42 were made to extend through the corresponding apertures in said shims 41 and said guides 38, screws 43 are thereupon applied through said walls 12 and shims 41 and driven into guides 38 for engaging the latter and thereby for rigidly connecting said guides 38 with the lower ends of walls 12 and for clamping shims 41 therebetween. Shims 41 are of course provided with proper apertures for accommodating therewithin said screws 43.

The dome portion 11 of casing 10 is provided with cutouts 44 for accommodating therewithin heads of screws 43 and for facilitating turning thereof.

Rigidly with said plate 33 and extending therefrom in an upward direction is extension 45 which rigidly supports on one side thereof motor casing 46, which is disposed above one end of said casing 10. Said motor casing 46 encloses a compressed air operable motor for driving shaft 47 which is connected with a rotor in the motor. Said shaft 47 passes through said extension 45 and is journalled therewithin.

The motor is provided with a flexible intake hose 48, the opposite end of which connects with an air compressor (not shown). The opposite side of the motor casing 46 has an exhaust pipe 49 connected thereto, the opposite end of which exhaust pipe 49 is set within opening 50 made in dome 11 of casing 10 (Fig. 4), for the purpose of passing the exhausted air into casing 10 for the purpose of cooling the tubular file member 20 as well as the work, and for blowing out the filings through longitudinal openings 51 made in dome 11 of casing 10. Said openings 51 are made in the side of dome 11 opposite from that which is provided with said opening 50.

The outer end of shaft 47 has gear 52 connected thereto through the means of a rigidly formed collar 53 and pin 54. Said gear 52 meshes with a larger gear 55 which is mounted upon the outer end of shaft 56 which is journalled for a rotary movement within plate 33 above said shaft 35. A smaller gear 57 is mounted upon said shaft 56 intermediately of said plate 33 and said gear 55. Collar 58 which is integrally formed with both of said gears 55 and 57 is keyed to said shaft 56 through the medium of pin 59. Said gear 57 meshes with said gear 36. If gear 52 makes about 6000 revolutions per minute this speed is reduced so that gear 36 is caused to make approximately 1800 revolutions per minute.

The several gears aforesaid are enclosed within housing 60 which is affxed to the outer faces of plate 33 and extension 45 by means of a plurality of screws 61 passed through the side of said housing 60 and made to engage said plate 33 and extension 45, as is seen in Fig. 1.

Affixed to the end of casing 10, adjacent its end nearest plate 13 is handle 62 which extends upwardly in a vertical direction from said casing 10, which may be grasped by an operator's hand for shifting the device along the work.

It is noted that plate 13, closure 14, plate 33 and housing 60 remain flush by their lower ends with the lower ends of side walls 12 and do not overlap shims 41 or the ends of guides 38 in order to prevent their contact with the work and do away with any interference with shims 41 and the operation of said guides 38 and their extensions 39.

Optionally, an electric motor may be used in lieu of a compressed air motor. If the former is used feeding of air into casing 11 for cooling the tubular file member 20 and the work and for blowing the filings through openings 51, may be dispensed with. On the other hand, if an electric motor is used the same may be made to operate a suitable air blower to connect with casing 10 for the purpose hereinabove specified.

Flexible hose 48, or in lieu thereof electric wires, if made sufficiently long, will permit shifting of the device to a considerable distance to perform a desired filing operation upon any work.

It is to be understood that the filing device herein disclosed may be shifted along any work to be filed either longitudinally or transversely with relation to the tubular file member 20.

It is further observed that plates 13 and 33 and their associated races and plugs 19 and 25, respectively, may be broadly considered as journal heads for supporting the tubular file member 20 for its rotary shifting movement.

From a broader aspect of the invention casing 10 with its coacting guides 38 and extensions 39 may all be considered as an integral casing with a longitudinal slot provided therein through which a portion of the periphery of the tubular file member is extended to contact therewith with a work to be filed.

Although member 20 is interchangeably referred to herein as being cylindrical and tubular, it is to be understood that one designation broadly includes the other, as obviously said member 20 may be made either tubular or cylindrical. When tubular, plugs 19 and 25 are made to enter inwardly at the ends of said member 20, as seen in Fig. 3. If said member 20 is made solid and cylindrical, polygonal sockets may be made at the ends thereof to receive correspondingly shaped polygonal plugs to substitute for cylindrical plugs 19 and 25. Such a modification would of course dispense with pins 23 and 26 and with their coacting slots 24 and 27.

From a broader aspect of the invention guides 38 and extensions 39 may be eliminated, in which case the lower free edges of walls 12 coming in contact with the work will limit further filling operation of the cylindrical file member 20.

It is also noted that guides 38 of various thicknesses may be interchangeably used by directly affixing the same to walls 12, for thereby predetermining the depth of the cut to be made by the cylindrical file member 20 in the work to be filed, thereby eliminating the necessity of using shims 41.

By virtue of the downwardly tapered surface 40 of each extension 39 it is possible for the cylindrical file member 20 to extend through the slot defined by the sharp edges of said extensions 39 and without any interference therefrom. Furthermore this construction fills out the casing so that most of the filings would be directed into the casing and along the wall thereof at which said openings 51 are provided to be blown out therethrough by means of the exhausted air directed from the exhaust pipe 49, assuming that the direction of rotation of said cylindrical file member 20 is clockwise as indicated by an arrow in Fig. 4.

While there is described herein a preferred embodiment of the present invention, it is nevertheless to be understood that minor changes may be made therein without departing from the spirit and scope of the invention as claimed.

What I claim as new is:

1. A rotary file comprising an oblong casing, a cylindrical file member rotatably supported within said casing in a longitudinal relation, said cylindrical file member being provided with cutting ridges upon its periphery, means for imparting a rotary movement to said cylindrical file member, said casing having an inverted U-shape in cross section, a guide block adjustably mounted on the lower end face of each leg of said inverted U, the inner edges of said guide blocks being spaced apart to provide a longitudinal slot through which the cutting portion of said file member extends, the lower faces of said blocks being coplanar and adapted to engage the work to be filed to limit the depth of cut, detachable shims interposed between the lower end faces of the legs of said inverted U-shaped casing and the upper faces of said blocks, detachable means to secure said blocks and shims to said legs, said cylindrical file having a short axial slot in each end thereof, the width of each axial slot being different, a short plug fitted into each end of the cylindrical file, each plug having a stud extending radially therefrom, each stud having a diameter corresponding to the width of one of said axial slots, said studs slidably engaged in said axial slots, said plugs being rotatably mounted in head plates secured to the ends of said casing, one of said head plates being detachable, whereby the file member may readily be removed and replaced and mounted so that the cutting ridges may rotate properly.

2. A rotary file comprising an oblong casing, a cylindrical file member rotatably supported within said casing in a longitudinal relation, said cylindrical file member being provided with helical cutting ridges upon its periphery, means for imparting a rotary movement to said cylindrical file member, said casing having an inverted U-shape in cross section, a guide block adjustably mounted on the lower end face of each leg of said inverted U, the inner edges of said guide blocks being spaced apart to provide a longitudinal slot through which the cutting portion of said file member extends, the lower faces of said blocks being coplanar and adapted to engage the work to be filed to limit the depth of cut, detachable shims interposed between the lower end faces of the legs of said inverted U-shaped casing and the upper faces of said blocks, detachable means to secure said blocks and shims to said legs, said cylindrical file having a short axial slot in each end thereof, the width of each axial slot being different, a short plug fitted into each end of the cylindrical file, each plug having a stud extending radially therefrom, each stud having a diameter corresponding to the width of one of said axial slots, said slots slidably engaged in said axial slots, said plugs being rotatably mounted in head plates secured to the ends of said casing, one of said head plates being detachable, whereby the file member may readily be removed and replaced and mounted so that the helical cutting ridges may rotate properly.

References Cited in the file of this patent

UNITED STATES PATENTS

| | | |
|---|---|---|
| 1,776,450 | Reid | Sept. 23, 1930 |
| 1,881,705 | Lapoint | Oct. 11, 1932 |
| 2,043,509 | Easters | June 9, 1936 |
| 2,066,741 | Ripsch | Jan. 5, 1937 |
| 2,269,352 | Bacon | Jan. 6, 1942 |

FOREIGN PATENTS

| | | |
|---|---|---|
| 297,502 | Switzerland | June 1, 1954 |